US00RE42928E

(19) United States
(12) Reissued Patent
Yang

(10) Patent Number: US RE42,928 E
(45) Date of Reissued Patent: Nov. 15, 2011

(54) METHOD AND SYSTEM FOR CONTROLLING OPERATION MODE SWITCHING OF PORTABLE TELEVISION (TV) PHONE

(75) Inventor: Jae-Duk Yang, Daegu (KR)

(73) Assignee: Samsung Electronics Co., Ltd (KR)

(21) Appl. No.: 11/071,897

(22) Filed: Mar. 3, 2005

Related U.S. Patent Documents

Reissue of:

(64) Patent No.: 6,529,742
Issued: Mar. 4, 2003
Appl. No.: 09/473,241
Filed: Dec. 27, 1999

(30) Foreign Application Priority Data

Dec. 26, 1998 (KR) ..... 98-59063

(51) Int. Cl.
*H04M 1/00* (2006.01)
*H04B 1/38* (2006.01)

(52) U.S. Cl. ..... 455/556.1; 455/415; 455/566; 348/552

(58) Field of Classification Search ..... 455/403, 455/414, 422.1, 550.1, 556.1, 556.2, 557, 455/566, 567, 569.1, 569.2, 343, 344, 575.1, 455/414.1, 415; 348/14.01, 14.11, 552; 370/311
See application file for complete search history.

(56) References Cited

U.S. PATENT DOCUMENTS 4,545,841 A 10/1985 Jackrel
4,776,209 A 10/1988 Patchel
5,056,153 A * 10/1991 Taniguchi et al. ..... 455/556.1
5,612,732 A * 3/1997 Yuyama et al. ..... 348/14.01
5,684,918 A 11/1997 Abecassis
5,870,389 A * 2/1999 Hadar et al. ..... 370/311
5,890,071 A * 3/1999 Shimanuki ..... 455/567

(Continued)

FOREIGN PATENT DOCUMENTS

DE 3216197 A1 * 11/1983

(Continued)

OTHER PUBLICATIONS

Funkschau 1998, No. 24 of Nov. 13, 1998.

*Primary Examiner* — Quochien B Vuong
(74) *Attorney, Agent, or Firm* — The Farrell Law Firm, P.C.

(57) ABSTRACT

A method of controlling switching of an operation mode of a TV phone. The TV phone includes a TV unit that reproduces and outputs a video signal and an audio signal from a selected channel. A display unit interfaces with the TV unit and receives and displays the video signals from the TV unit while in a TV mode. A TV audio signal processer receives the audio signal from the TV unit and outputs audible sound. An MRFU receives data of a forward channel transmitted from a base station. An MSP provides a channel selecting signal to the TV unit in the TV mode and transmits and receives an audio signal input from the MRFU in a phone mode. The method comprises the steps of alerting the user of an incoming call in response to an incoming call signal transmitted from the base station when the TV phone is in a TV mode and switching from the TV mode to the phone mode, the switching preferably including disabling the operation of the TV unit.

23 Claims, 2 Drawing Sheets

U.S. PATENT DOCUMENTS

| | | | | | |
|---|---|---|---|---|---|
| 5,911,848 | A | | 6/1999 | Haber et al. | |
| 5,920,806 | A | * | 7/1999 | Gouessant | 455/557 |
| 5,991,637 | A | * | 11/1999 | Mack et al. | 455/563 |
| 6,052,444 | A | * | 4/2000 | Ferry et al. | 379/93.35 |

FOREIGN PATENT DOCUMENTS

| | | |
|---|---|---|
| DE | 196 48 991 | 6/1998 |
| DE | 197 00 500 | 7/1998 |
| EP | 0 752 793 | 1/1997 |
| GB | 2 297 665 | 8/1996 |
| JP | 8-125723 | 5/1996 |
| KR | 97-55875 | 7/1997 |
| KR | 1019970055875 | 7/1997 |
| WO | 93/01685 | 1/1993 |
| WO | 98/56197 | 12/1998 |

* cited by examiner

METHOD AND SYSTEM FOR CONTROLLING OPERATION MODE SWITCHING OF PORTABLE TELEVISION (TV) PHONE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method and system for controlling operation of a hand-held portable cellular telephone, and more particularly to a method for controlling a switchover of an operation mode of an integrally combined television (TV) and portable cellular phone (hereinafter, referred to as "TV phone").

2. Description of the Related Art

In recent years, rapid and wide spread use of portable cellular telephones as a personal communication appliance has driven development of portable phones with a variety of functions in addition to a simple conversation function. For example, portable phones have developed to include a calculator, a biorhythm checking feature, and the capability of transmitting and/or receiving images of a TV and a video camera. The term "TV phone" herein refers to wireless portable cellular phones of all types which also provide television (TV) broadcast through a display unit of the portable phone, in addition to a cordless telephone conversation feature for telecommunication.

An example of the above TV phone is disclosed in Korean Patent Application No. 1995-46026 entitled "A Combined TV Receiver and Cellular Phone" by LG Electronics Co., Ltd., filed in the Korean Industrial Property Office on Dec. 1, 1995 and published on Jul. 31, 1997 by that Office.

For reception of a TV broadcast, the portable phone is equipped with two radio frequency units therein, as disclosed in the above-mentioned Korean patent application 1995-46026. The reason for this is that a frequency bandwidth necessary for transmitting and receiving telecommunication messages (i.e., voice and data) is different from that for a TV broadcast. An operation mode of the TV phone is classified into a phone mode, a waiting mode, and a TV mode, which is also used as the waiting mode. When operating in the TV mode, the TV phone allows a user to watch and hear images and voices of the television program received on a display unit, i.e. a Thin Film Transistor (TFT) Liquid Crystal Display (LCD), and a speaker or an earphone of the portable phone.

Disadvantages arise in the prior art when the TV phone is operating in the TV mode and there is an incoming call and/or an incoming character data message.

There is a need for a portable TV phone that allows the operation mode of the TV phone to be automatically switched from a TV mode to a phone mode so that the user (i.e., the called party) can speak over the telephone with the calling party and the circuitry associated with the TV function can be disabled in order to prevent unnecessary consumption of the battery during the ensuing phone conversation. In addition, there is a need for a portable TV phone that allows the user to reject the incoming call in order to continue to view the TV program when the user does not care to respond to the incoming call.

The TV phone of the above-cited patent application 1995-46026 cannot process character messages received by the transmitter/receiver of the telecommunications feature when the TV is operating in TV mode and receiving a TV signal via the receiver of the TV. In addition, when the TV phone of patent application 1995-46026 receives an incoming voice call, the telephone rings, but it is impossible to directly switch the TV mode to the phone mode while in the TV mode. Accordingly, the user must turn off the TV phone, manually switch the TV mode to the phone mode with regard to every incoming call, and turn the phone back on. This consumes battery power and is highly inconvenient to the user.

SUMMARY OF THE INVENTION

Therefore, an object of the invention is to provide a method for controlling switching of an operation mode of a TV phone where the operation mode of the TV phone is automatically switched from a TV mode to a phone mode upon the occurrence of an incoming of a call.

It is another object of the invention to provide a method for controlling a switching of an operation mode of a TV phone where the user is informed of the call. It is also an objective that, upon reception of a call, the user may choose whether to switch the TV phone from the TV mode to the phone mode.

In accordance with one embodiment of the present invention, these objectives are accomplished by providing a method for controlling an operation mode switching of a portable TV phone. The TV phone includes a TV unit that reproduces and outputs a video signal from a selected channel. A TV audio signal processor processes an audio signal received by the TV unit for the selected channel and outputs it as audible sound. As described below, a display unit receives the video signal from the TV unit and displays the inputted video signal from the selected channel while in the TV mode. A mobile radio frequency processor ("MRFU") receives data of a forward channel transmitted from a base station. A mobile signal processor (MSP) has a TV mode and a phone mode, provides a channel selection signal to the TV unit in the TV mode and generates a character control signal in response to an incoming call. An on-screen display. ("OSD") generates character images (including image character and graphic images) corresponding to the character control signal received at an input of the OSD. A multiplexer receives as input the character images of the OSD and the video signal of the TV unit and has an output that interfaces with the display unit. The multiplexer outputs the character images of the OSD or the video signal of the TV unit to the display unit based on a control signal received by the multiplexer from the MSP.

The method includes the steps of alerting the user of an incoming call by display of a character message on the display unit and/or an audio signal outputted from a speaker of the TV phone. The alert is in response to an incoming call signal transmitted from the base state when the TV phone is in the TV mode, i.e., in a state in which the video signals of the selected channel from the TV unit are displayed on the display unit and the audio signal for the selected channel are output by the TV audio signal processor. The TV phone is switched from the TV mode to the phone mode by disabling the operation of the TV unit in response to input by the user of a command that permits the call to proceed. The command initiates transmission of an incoming call response message to the calling party through a reverse channel. (Alternatively, the switching and proceeding with the call can occur automatically, if an appropriate setting is made by the user.) However, the TV phone is maintained in TV mode and the character message and/or audio signal used to alert the user to an incoming call is terminated in response to input by the user of a command rejecting the incoming of the call from the calling party.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Figure 1:
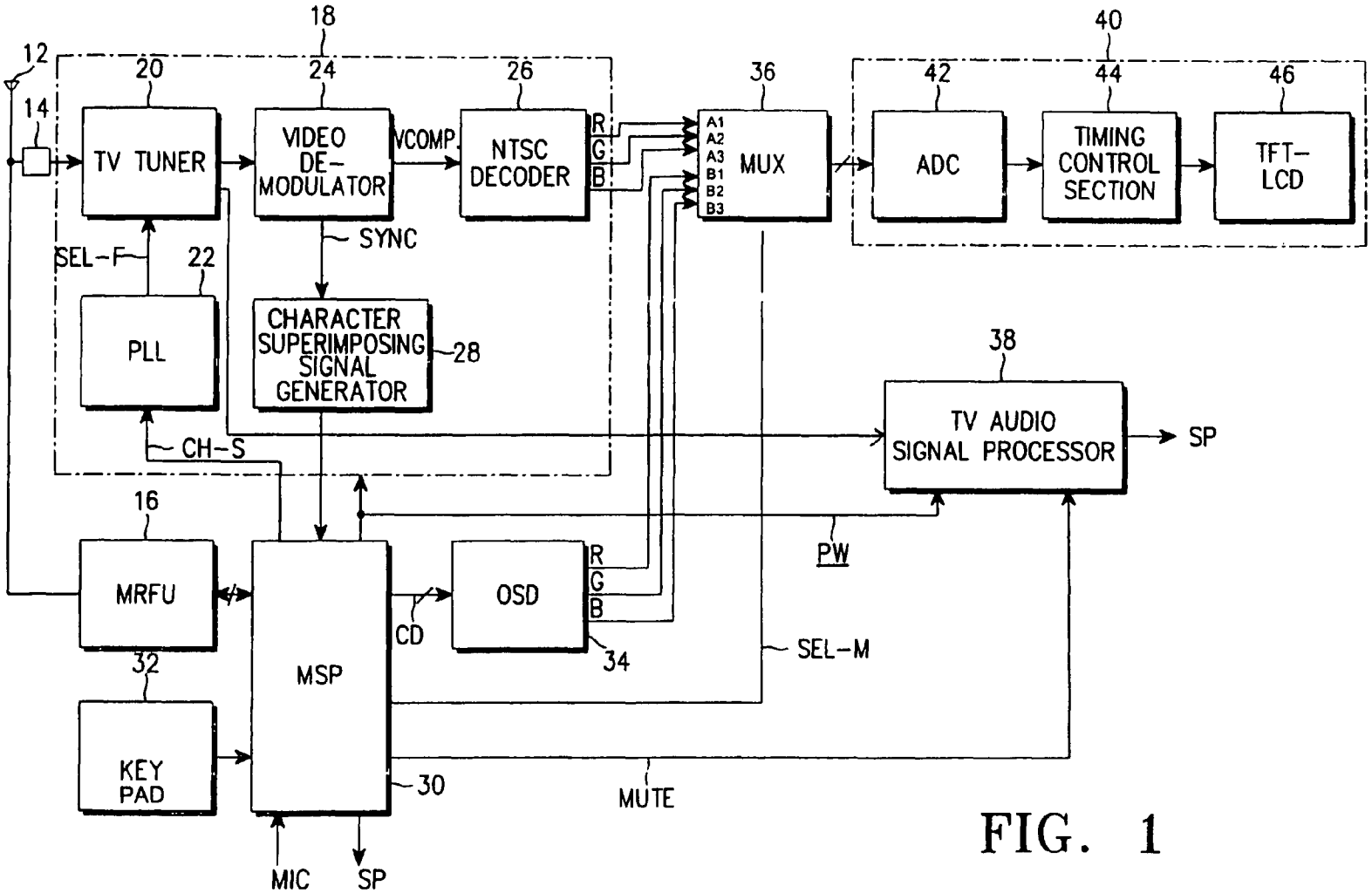
FIG. 1 is a block diagram illustrating the construction of a TV phone according to a preferred embodiment of the present invention.

Referring to FIG. 1, a block diagram illustrating the construction of a TV phone according to a preferred embodiment of the present invention is shown. In FIG. 1, a mobile radio frequency unit (MRFU) 16, mobile station processor (MSP) 30, and key pad 32 all of a portable phone module, are shown. Such circuits may be configured as in conventional portable digital cellular phones, e.g., CDMA type portable cellular phones, and such construction and operation will be apparent from the following detailed description.

Also, the TV phone includes TV unit 18, an on-screen display (OSD) 34, a multiplexer 36 (hereinafter, referred to as "MUX"), a TV audio signal processor 38, and a display unit 40. The TV unit 18 and the TV audio signal processor 38 are TV modules.

Operations of the TV phone of FIG. 1 are as follows: when the TV phone is set to a TV mode, an alarm informs the user of the incoming call. The alarm can be set to one of three modes, for example: the incoming call alarm may trigger an audio alert, it may mute the TV phone audio and switch an alerting image onto the display of the TV phone, or it may display a call incoming message at a specific region on the display.

A radio-frequency, electromagnetic signal is received by an antenna 12 which converts the radio-frequency, electromagnetic signal into an electrical signal which is supplied to a radio frequency filter, i.e., a bandpass filter 14. The bandpass filter 14 is operative to pass only frequency components of a frequency bandwidth for a TV broadcast. The bandpass filter 14 generates filtered signals, which are applied to the TV unit 18.

When the TV phone is set to a TV mode, the MSP 30 supplies a power control signal PW for the TV unit 18 and the TV audio signal processor 38. The MSP 30 supplies a phase locked loop, (hereinafter, referred to as "PLL"), 20 in the TV unit 18 with a channel selecting signal inputted via the key pad 32 or a channel selecting signal CH-S for selecting a previous viewing channel. PLL 20 oscillates a tuning frequency SEL-F corresponding to the channel-selecting signal and applies the SEL-F signal to TV tuner 20. TV tuner 20 combines the filtered signal from the bandpass filter 14 and the tuning frequency SEL-F from the PLL 20 and, for the selected channel, outputs a down-converted video intermediate frequency (VIF) signal to video demodulator 24 and outputs audio intermediate frequency (AIF) signal to TV audio signal processor 38.

A video demodulator 24 coupled to the output terminal of the TV tuner 20 demodulates the video intermediate frequency (VIF) signal and outputs the resultant composite video signal Vcomp to NTSC decoder 26, (a video decoder). Video demodulator 24 also outputs a synchronizing signal SYNC of the composite video signal to a character superimposing signal generator 28. The NTSC decoder 26 decodes the composite video signal Vcomp and outputs the decoded composite video signal as color signals R, G, B to terminals A1–A3 of MUX 36.

The character superimposing signal generator 28 counts the synchronizing signal SYNC, and generates a character-superimposing signal if the counted signal value is a predetermined value. The character superimposing signal generator 28 comprises a counter that counts a horizontal synchronizing signal, a memory that stores a position value of a horizontal line, and a comparator that compares the counted signal value and the position value stored in memory. The character superimposing signal generator 28 generates a character superimposing control signal during a retrace period of the horizontal synchronizing signal if the comparator indicates the counted signal value from the counter is equal to the position value stored in memory. The character superimposing control signal is generated at regular intervals in every field or frame period.

Accordingly, the TV unit as constructed above is activated by a power control signal from the MSP 30, and generates a video signal and an audio signal of a TV broadcast channel according to the channel selecting signal, while also generating a character superimposing control signal. The generation of such a character superimposing control signal will be advantageously used when the alert for an incoming call is a message displayed at a specific region on the display, as described further below.

MUX 36 selects the video signals R, G, and B input from the NTSC decoder 26 when a video selecting signal SEL-M output is from the MSP 30 at a "low" state. Video signals R, G, B, from NTSC decoder 26 are then applied to analog-to-digital converter (ADC) 42 of the display unit 40. The ADC 42 converts the selected video signals R, G, and B into digital signals which are output to timing control section 44. The timing control section 44, which includes a synchronizing signal generator for generating a pseudo-horizontal synchronizing signal and a pseudo-vertical synchronizing signal, drives a TFT-LCD 46. An image is thus displayed on the screen of the TFT-LCD 46. In addition, the TV audio signal processor 38 processes the audio intermediate frequency (AIF) signal inputted thereto from the TV tuner 20 to reproduce an audio signal for a TV program and output the reproduced audio signal through a transducer such as a speaker.

Thus, TV unit 18, TV audio signal processor 38, and display unit 40 receive and reproduce a video signal and an audio signal for a TV program in TV mode for a channel selected via the MSP 30. During this operation, when a user depresses a channel selection key (or keys) on the key pad 32 to select a desired channel, the MSP 30 changes the channel selecting signal CH-S output to PLL 22, thus changing the tuning frequency and the output of the PLL 22, which in turn changes the channel of the TV tuner.

MRFU 16 is coupled to the antenna 12 and receives a radio-frequency signal of a transmitting/receiving frequency bandwidth for a portable phone. MRFU 16 converts a received analog signal into a digital signal for further processing or converts a digital signal into an analog signal and power-amplifies the converted signal for transmission via antenna 12. MRFU 32 comprises, for example, an RF unit combined with a baseband analog circuit of a conventional portable phone. For example, MRFU 32 can be constructed by combining a CDMA type radio transceiver unit, such as, for example, "BBA2.X (Q5312CDMA)" chip manufactured by QUALCOMM, Co. as a BBA circuit (for converting an analog signal into CDMA type digital data and vice versa), and an RF unit.

MSP 30 receives commands supplied from the keypad 32 and generates control signals corresponding to the commands. MSP 30 also performs a variety of operations such as analysis of a received forward channel data message, reproduction of an analog audio signal (i.e., a voice telephone signal) from the received data (including demodulation), extraction of character data from the received data and demodulating, de-interleaving, decoding, data signal processing, and vocoding of the digital signal inputted thereto from the MRFU 16. The MSP 30 also performs operations that output the reproduced analog audio signal to a speaker, and convert an analog audio signal input from a microphone (MIC) into a CDMA type digital signal for transmission to a channel through the MRFU 16. In addition, the MSP 30 informs a user watching a TV program of reception of an incoming call according to a call alarm mode set in an inner memory of the MSP. The call alarm mode is invoked to alert the user if the received forward channel data message is a message associated with an incoming call. The MSP 30 may be, for example, an MSMXX00 series one-chip type available from QUALCOMM Co.

The OSD 34 is coupled to an output of the MSP 30. OSD 34 generates OSD video signals corresponding to character generating control data output from the MSP 30. The OSD video signals R, G, B are to output to input terminals B1–B3 of the MUX 36. As noted above, in TV mode, MUX 36 selects the video signals R, G, and B inputted to the input terminals A1–A3 when video selecting signal SEL-M output from the MSP 30 is at a "low" state.

Figure 2:
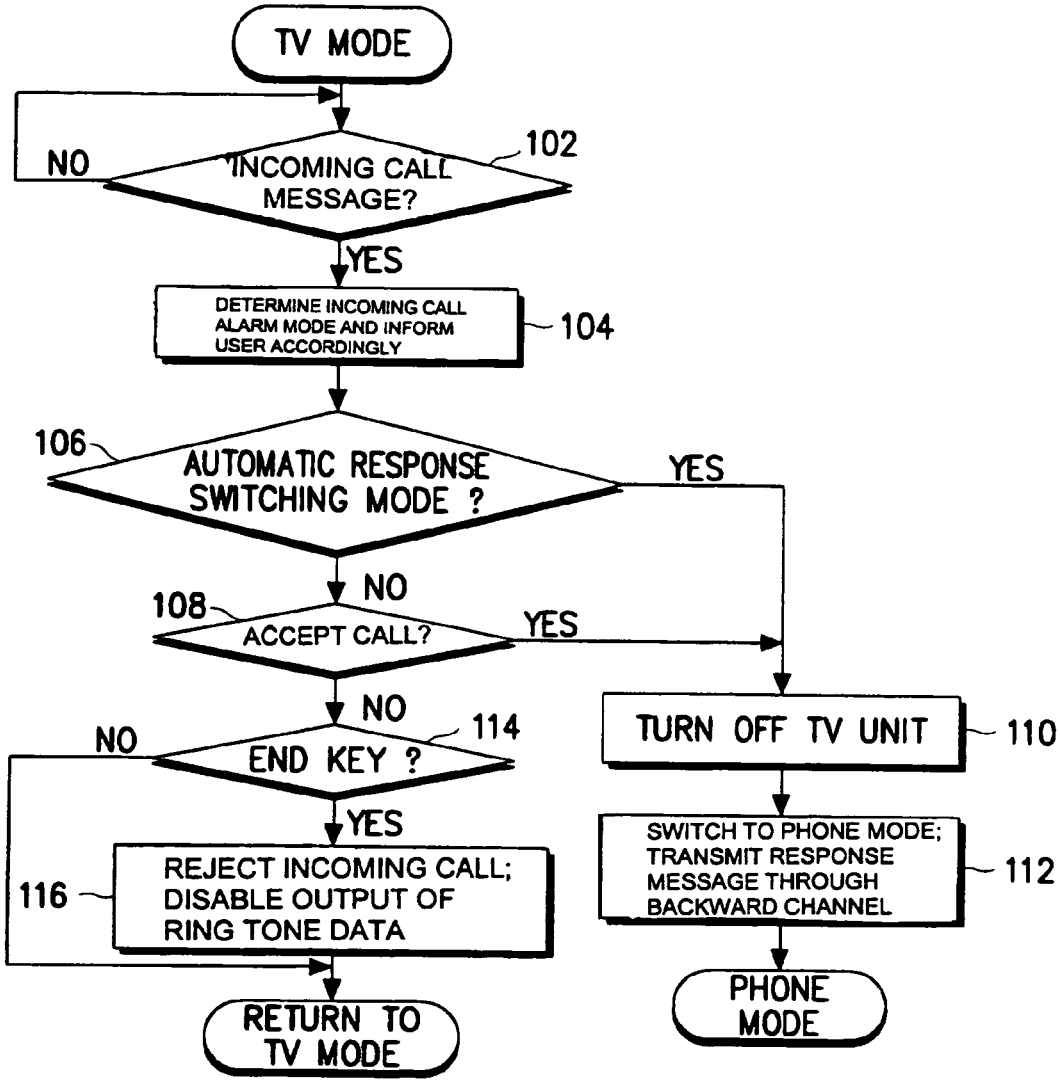
FIG. 2 is a flowchart illustrating the process of controlling switching of an operation mode of the TV phone according to a preferred embodiment of the present invention.

FIG. 2 is a flowchart illustrating the process of controlling the switching of an operation mode of the TV phone according to a preferred embodiment of the present invention, in which the operation mode of the TV phone of FIG. 1 is switched from a TV mode to a phone mode upon the reception of an incoming call message, or is maintained in the TV mode. A program for the flowchart is housed in a memory block of the MSP 30 in shown in FIG. 1.

As shown in FIG. 2, the TV phone is initially in the TV mode, where the user watches the TV program of a selected channel. The MSP 30 monitors the output of the MRFU 16 and determines whether or not an incoming call message has been received via the MRFU 16 at step 102.

If it is determined at step 102 that a message associated with an incoming call has not been received, the MSP 30 continues to operate in the TV mode.

If it is determined at step 102 that the MRFU 32 has received a message associated with an incoming call, the program proceeds to step 104 where the MSP 30 determines the incoming call alarm mode as set in its memory. As noted above, three such incoming call alarm modes can be (1) an audio alert, (2) muting the audio of the TV program and switching an image onto the display and (3) display an incoming call message on a specific region of the display. At step 104, the MSP 30 also informs the user of the incoming call in accordance with the set incoming call alarm mode. While the incoming call alarm mode may be selected from among a bell mode, a vibration mode and a lamp (soundlessness) mode, for example, the audio signal of a TV program or output of the OSD 34 may also be suitably controlled to alert the user. For example, the user may be alerted by muting the output of the TV audio signal processor 38 and/or by controlling the display unit 40 to switch to display a preprogrammed screen, or to display specific characters thereon which visually alerts the user of an incoming call. Such an alerting operation can be implemented by applying a mute signal MUTE to the TV audio signal processor 38. In addition, MSP 30 may send a stored character generating control signal CD to the OSD, which uses the CD signal to generate a call alert video display. The MSP 30 may switch the MUX (via a high SEL-M) to display a corresponding preprogrammed screen generated by the OSD 34. Alternatively, using the character superimposing signal generated by character superimposing signal generator 28, the MSP may repeatedly switch the MUX 36 so that a call alert video display in the form of a short character message is displayed at a particular region of the display, while displaying the TV program in the remaining region of the display.

Subsequently, the program proceeds to step 106 at which it is determined by the MSP 30 whether or not an automatic response switching mode has been set through detection of a flag of the memory therein. The term "automatic response switching mode" means an operation mode set by the user that automatically connects the incoming call.

If it is determined at step 106 that the automatic response switching mode has been set, the program proceeds to step 110 where the MSP 30 turns off the TV unit 18 and the TV audio signal processor 38 by deactivating the power control signal PW. This reduces the power consumption of a battery. At subsequent step 112 the MSP 30 switches from the TV mode to the phone mode and supplies the MRFU 16 with a response signal for the incoming call. The MRFU 16 transmits the response signal to the base station through the reverse channel in order to establish a telephone conversation channel to speak over. The subsequent establishment of the call can follow the procedures of a conventional portable phone.

If, on the other hand, it is determined at step 106 that that the automatic response switching mode is not set, the program proceeds to step 108 where the MSP 30 detects whether or not an input signal has been received from the user indicating the user wants to accept the incoming call. The signal may be generated by a key on keypad 32 designating phone call acceptance. Generally, any key other than a SEND key, an OK key or an END key may be used for the phone call acceptance key. If the user accepts the incoming call by depressing the appropriate key, the program proceeds to steps 110 and 112, as described above.

On the other hand, if it is determined at step 108 that there is no indication that the user accepts the call (for example, the phone call acceptance key has not been depressed) the program proceeds to step 114, where the MSP 30 determines whether or not a key on the keypad that signals rejection of an incoming call (such as the END key) has been selected. At step 114, the key signaling rejection of the call is not selected, the MSP 30 determines that a user does not want to take the incoming call and returns to TV mode. The MSP repeatedly executes the above-mentioned process beginning with step 102. Accordingly, when an incoming call message is received from the base station through the forward channel, the MSP 30 informs the user that an incoming call occurs through a process routine beginning with step 104.

At the step 114, if the user selects a key on the key pad 32 signaling rejection of the incoming call, the program proceeds to step 116 where the MSP 30 rejects the incoming call. Such a rejection of the incoming call is performed by the MSP 30 disabling or discontinuing any call alerts, for example, disabling ring tone data outputted to the speaker SP initiated by ring data included in the data of the forward channel. When the output of alerts associated with an incoming call ring are disabled, the phone returns to TV mode, where a TV image and an audible sound of a selected channel are reproduced and outputted continuously through the TFT-LCD 46 of the display unit 40 and the TV audio signal processor 38. The MSP 30 also repeatedly executes the process beginning with step 102.

As apparent from the above description, the TV phone of the present invention provides an advantage in that in a state in which a user watches a TV program in a TV mode, when an incoming of a call occurs, a user is so informed, and the operation mode of the TV phone may be automatically or manually switched from the TV mode to the phone mode. When switched, the TV unit is turned off, thereby preventing excessive discharge of the battery.

While the description in the above embodiment includes the TV unit 18 that outputs R, G, and B video signal, the display unit 40 that converts the analog video signals into digital video signals and displays the converted signal, and the multiplexer 36 that selectively transmits TV video signals and the video signal of the OSD to the display unit, the above structural elements can be replaced with other elements that perform the same functions by a person skilled in the art.

For example, the TV unit may alternatively output analog complex video signals and complex synchronizing signals. The display unit may be constructed with an LCD drive and a TFT-LCD that displays images using the complex video signals and complex synchronizing signal from the TV unit. The image of the OSD can similarly be displayed using a video memory such as a video memory or video ROM and a video memory controller (including a timing generator) that generates a complex video signal. As a result, the switching operation in the multiplexer is not necessary and the time for displaying the image of the OSD can be reduced.

In addition, using a video memory and video memory controller as described immediately above, the image of the OSD can be displayed at desired position on the display unit without the character superimposing signal generator 28 shown in FIG. 1. Where the display of the OSD is controlled as described immediately above, a character message alerting the user to an incoming call of the OSD can be displayed without activation of the image-superimposing signal.

In addition, in the TV phone of the present invention, the operation mode of the TV phone is relatively easily switched from the TV mode to the phone mode while interrupting power supplied to a TV module related circuit when an incoming call occurs during the viewing of any TV program in a TV mode, thereby reducing battery power consumption.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A method of controlling switching of an operation mode of a TV phone, where the TV phone includes a TV unit that reproduces and outputs a video signal and an audio signal from a selected channel, a display unit that interfaces with the TV unit and receives and displays the video signals from the TV unit while in a TV mode, a TV audio signal processor that receives the audio signal from the TV unit and outputs audible sound, a mobile radio frequency processor (MRFU) that receives data of a forward channel transmitted from a base station, and a mobile signal processor (MSP) that provides a channel selecting signal to the TV unit in the TV mode, and transmits and receives an audio signal input from the MRFU in a phone mode, the method comprising the steps of:

alerting a user of an incoming call in response to an incoming call signal transmitted from the base station when the TV phone is in the TV mode;

superimposing information on the display unit about the incoming call; and automatically disabling the TV unit and switching directly from the TV mode to the phone mode.

2. The method of claim 1, wherein the step of switching from the TV mode to the phone mode is in response to input by the user of a command that permits the call to proceed.

3. The method of claim 1, wherein the step of switching from the TV mode to the phone mode is prevented in response to input by the user of a command rejecting the incoming call.

4. The method of claim 3, wherein the input by the user of a command rejecting the incoming call terminates the step of alerting the user of an incoming call.

5. The method of claim 1, wherein the switching from the TV mode to the phone mode includes transmitting an incoming call response message to the calling party through a reverse channel.

6. The method of claim 1, wherein the step of alerting the user of an incoming call includes displaying a character message on the display unit.

7. The method of claim 1, wherein the step of alerting the user of an incoming call includes interrupting of an audio output from a speaker of the TV phone.

8. The method of claim 1, wherein the step of alerting the user of an incoming call includes generating an audio output from a speaker of the TV phone.

9. The method in accordance with claim 1, wherein the disabling of the operation of the TV unit is by interrupting power supply voltage supplied to the TV module.

10. The method of claim 1, wherein the step of switching from the TV mode to the phone mode, is performed automatically upon receipt of an incoming call signal.

11. The method of claim 10, including the additional step of setting the TV phone to an automatic mode prior to reception of the incoming call signal, the step of switching from the TV mode to the phone mode being enabled by the setting of the automatic mode and occurring automatically.

12. The method of claim 10, wherein the switching step further comprises the step of transmitting a response message for the incoming call to the calling party through a reverse channel.

13. A method of controlling switching of an operation mode of a TV phone, the method comprising the steps of:

alerting a user of an incoming call in response to an incoming call signal transmitted from a base station when the TV phone is in a TV mode;

superimposing information about the incoming call; and automatically disabling the TV unit and switching directly from the TV mode to a phone mode.

*14. The method of claim 13, wherein the step of altering the user of the incoming call comprises the step of displaying a character on the display unit.*

*15. The method of claim 13, wherein the step of alerting the user of the incoming call comprises the step of interrupting an audio signal output from a speaker of the TV phone.*

*16. The method of claim 13, wherein the step of altering the user of the incoming call comprises the steps of:*

*muting a TV audio signal; and*

*turning off a display TV image signal.*

*17. A method of controlling an incoming call in a television (TV) mode of a TV phone, the method comprising the steps of:*

*executing the TV mode;*

*superimposing an incoming call message on a display unit, when the incoming call is received in the TV mode; and*

*switching directly from the TV mode to a phone mode, if an automatic response switching mode is selected.*

*18. The method of claim 17, further comprising the step of:*

*checking an input of a call acceptance key, if the automatic response switching mode is not selected; and*

*switching the TV mode to the phone mode, if the call acceptance key is pressed.*

*19. The method of claim 18, wherein the incoming call is a voice call.*

*20. The method of claim 17, further comprising the step of alerting a user of the incoming call by displaying a character message on the display unit.*

*21. The method of claim 17, further comprising the step of alerting a user of the incoming call by interrupting an audio signal output from a speaker of the TV phone.*

*22. The method of claim 17, further comprising the step of alerting a user of the incoming call by muting a TV audio signal and turning off a displayed TV image signal.*

*23. The method of claim 17, wherein the incoming call is a character message call.*

* * * * *